US007267543B2

(12) United States Patent
Freidhoff et al.

(10) Patent No.: US 7,267,543 B2
(45) Date of Patent: Sep. 11, 2007

(54) GATED FEED SHOE

(75) Inventors: Timothy G. Freidhoff, Johnstown, PA (US); Alan William Baum, Homer City, PA (US)

(73) Assignee: Concurrent Technologies Corporation, Johnstown, PA (US)

( * ) Notice: Subject to any disclaimer, the term of this patent is extended or adjusted under 35 U.S.C. 154(b) by 341 days.

(21) Appl. No.: 10/832,559

(22) Filed: Apr. 27, 2004

(65) Prior Publication Data

US 2005/0238749 A1 Oct. 27, 2005

(51) Int. Cl.
*B29C 33/42* (2006.01)

(52) U.S. Cl. ....................................... 425/394; 249/134

(58) Field of Classification Search ................ 425/219, 425/260, 182
See application file for complete search history.

(56) References Cited

U.S. PATENT DOCUMENTS 2,970,554 A * 2/1961 Haupt ........................ 425/219
3,029,470 A * 4/1962 Frank ......................... 425/449
3,397,435 A * 8/1968 Jelesiewicz ................. 425/225
3,942,923 A * 3/1976 Binion ........................ 425/64
4,813,818 A 3/1989 Sanzone
5,395,227 A * 3/1995 Huggins, Sr. et al. ...... 425/145
5,885,625 A 3/1999 Beane et al.
6,241,935 B1 6/2001 Beane et al.
H1983 H 8/2001 Foster
6,302,675 B1 * 10/2001 Lienau ....................... 425/219
6,475,662 B1 11/2002 Spencer

* cited by examiner

*Primary Examiner*—Robert B. Davis
(74) *Attorney, Agent, or Firm*—Buchanan Ingersoll & Rooney PC

(57) ABSTRACT

A feed shoe having at least one feed chamber with an open bottom portion and an open front portion whereat a gate is provided. The gate can be vertically adjustable and can have a lower edge defining a leading edge of the feed chamber, wherein the leading edge can have a flat, serrated, or rounded profile depending upon the type of feed material used. The gate, or a separate main gate adjacent the gate, can have a flat, curved, or V-shaped inner surface facing the feed chamber, wherein a lower portion of the inner surface can have a stepped profile which shears the material in the feed chamber in separate planes. The feed shoe can further include an attachment portion adapted for adjustably retaining an end of at least one material feed delivery member in communication with said at least one feed chamber.

28 Claims, 18 Drawing Sheets

60

60

70

GATED FEED SHOE

BACKGROUND

The invention relates generally to a feed shoe of the type used in powder metallurgy processes, for feeding and depositing finely divided or pulverized particulate material, such as powdered metals and the like, into a die cavity for compacting. More particularly, the invention relates to a feed shoe having an adjustable gate member incorporated into a front portion of the feed shoe.

In powder metallurgy and other technologies using particulate materials, such as ceramics and carbides, products and parts are formed by pressing finely ground or atomized powders into a desired shape within a die cavity. Generally, the powders are compacted in the die cavity at room temperature and the then semi-dense compact is removed from the die and heated to bond the powders into a unified, dense mass. In powder metallurgy, the heat bonding procedure is generally known as sintering or in the case of ceramics and carbides, firing.

When these and similar procedures are employed, means are required for delivering measured amounts of powder or particulate to a die cavity on a powder press. Typically, feed shoes operate to deliver the powder or particulate material to the die cavity during the press cycle, commonly using a gravity assisted fill system, although pressure and vacuum assisted systems are also known. The process involves movement of the feed shoe containing particulate material on a shuttle which slides the feed shoe forward along the table of the die press to a position at which the bottom hole in the feed shoe is exposed, overlies, and registers with the die cavity, and deposits enough loose powder to fill the die cavity. Thereafter, the shuttle slides the feed shoe back along the table of the die press into a retracted position, which cuts off the flow of particulate material from the bottom hole of the feed shoe into the die cavity. The edge of the bottom hole of the feed shoe also levels off excess powder from the top of the filled die cavity as the feed shoe is retracted. The particulate material is then pressed into an article and the article is ejected from the die. The shuttle then slides the feed shoe forward along the table of the die press displacing the ejected article and again exposing the bottom hole of the feed shoe as it overlies and registers with the die cavity, and the process is repeated.

The design of the feed shoe is critical to the quality of the part being produced. However, conventional feed shoes typically are of a general design, configured to give average results when used to produce parts of an average geometry and size. In some application, for example the production of thermal battery pellets, the pellets can be disproportionately thin compared to the overall size, making the pellets naturally difficult to produce. One of the most notable problems is the die fill consistency. The thickness of the pellets makes it difficult to get an even die fill from front to back, thus magnifying the powder fill imbalance that is already an inherent problem with conventional die fill methods. "Powder pull-out," which is the tendency of the leading edge of the bottom hole in the feed shoe to drag feed material from the front to the back of the die cavity, typically occurs in the front of the die cavity as the feed shoe is retracted after filling the die cavity. In addition, the conventional feed shoe design does not allow thickness adjustment on a part from side to side which occurs as a result of tooling flatness, press set up, and the like. These are major problems for parts that are very thin to begin with, leading to tapered thickness, poor strength, and an increased number of rejected parts.

The conventional feed shoes can also perform inadequately in regard to providing weight consistency between die cavities in dual die cavity platforms, thus limiting the capability to press pellets with large areas and obtain the increased production benefits of dual cavity pressing. Also, the feed tube which delivers feed material, e.g., powder, into the feed chamber is not necessarily configured for optimum, even powder distribution across the width of the feed chamber. This likewise leads to inconsistent die cavity fill; in this case, from side to side. Moreover, the conventional feed shoe design is not conducive to low press cycle times. In particular, the configuration of the conventional feed shoe requires the top ram has to have a relatively high vertical travel in order to clear the feed shoe during the die cavity fill operation, thus increasing the overall cycle time.

Accordingly, there is a need for an improved feed shoe which is configured to reduce or eliminate the problems which can be common with conventional feed shoes described hereinabove.

SUMMARY

According to the invention, a feed shoe can be provided comprising at least one feed chamber, two shown, each having an open bottom portion and an open front portion, and a gate at the open front portion defining a front wall of the each feed chamber. Alternatively, a main gate and an optional auxiliary gate can both be provided adjacent the open front portion of the feed shoe. This optional auxiliary gate could be used to provide an additional shear plane, which is independent of the main gate so the height of the shear plane is adjustable. This feature may be conducive for improved die fill. Each main gate can have a lower edge adjacent the open bottom portion, and this lower edge can define a leading edge of the feed chamber. The gate can be vertically adjustable relative to the front portion, and, moreover, each side of the gate can be is individually vertically adjustable. In this way, the leading edge can be skewed, wherein one side is positioned at a different vertical position relative the opposite side in order to compensate for thickness variations from one side of a part to the other.

The leading edge of the gate can further have a profile which is a function of the type of feed material to be deposited into the feed chamber. More particularly, for example, the profile can be serrated, rounded, angled, or flat.

The gates, or main gate where an auxiliary gate is used, can further be provided with a specially configured inner surface facing the feed chamber. This inner surface can defines a front wall of each feed chamber and can thus alter the shape of the feed chamber. The inner surface can be flat, curved, or V-shaped, and can further have a lower portion thereof, near the open bottom of the feed chamber, provided with a certain profile which increases in thickness upwardly from the open bottom portion. Specifically, for example, the profile can be a stepped configuration wherein the thickness of the gate increases in steps from a lower edge thereof upwardly. The steps result in the feed material in the feed chamber being sheared in separate planes when the feed shoe is retracted after depositing feed material in the die cavity.

Alternatively to configuring the inner surface of the gate in different shapes, a separate main gate can be provided having an outer surface adjacent a separate gate member, and an inner surface which is specially configured in a flat, curved or V-shape, as described above. The inner surface of such a main gate can similarly be provided with the stepped profile which shears the feed material in separate planes.

Further in accordance with the invention, the feed shoe can further comprise an attachment portion for retaining one end of a material feed delivery member, or feed tube, in communication with the feed chamber. A separate feed tube can be provided to supply each separate feed chamber. The attachment portion can be adjustably attached to the feed shoe such that the end of each feed tube can be adjusted relative to each feed chamber to facilitate delivery of the material into the feed chamber. The attachment member can be adjustable front to back, side to side, and angularly. The attachment member can also be designed having a low profile such that the die press need not retract vertically as much as with a conventional feed shoe, which reduces press cycle time and speeds up the production process.

Other details, objects, and advantages of the invention will become apparent from the following detailed description and the accompanying drawings figures of certain embodiments thereof.

BRIEF DESCRIPTION OF THE DRAWING FIGURES

A more complete understanding of the invention can be obtained by considering the following detailed description in conjunction with the accompanying drawings, in which.

DETAILED DESCRIPTION

Figure 1:
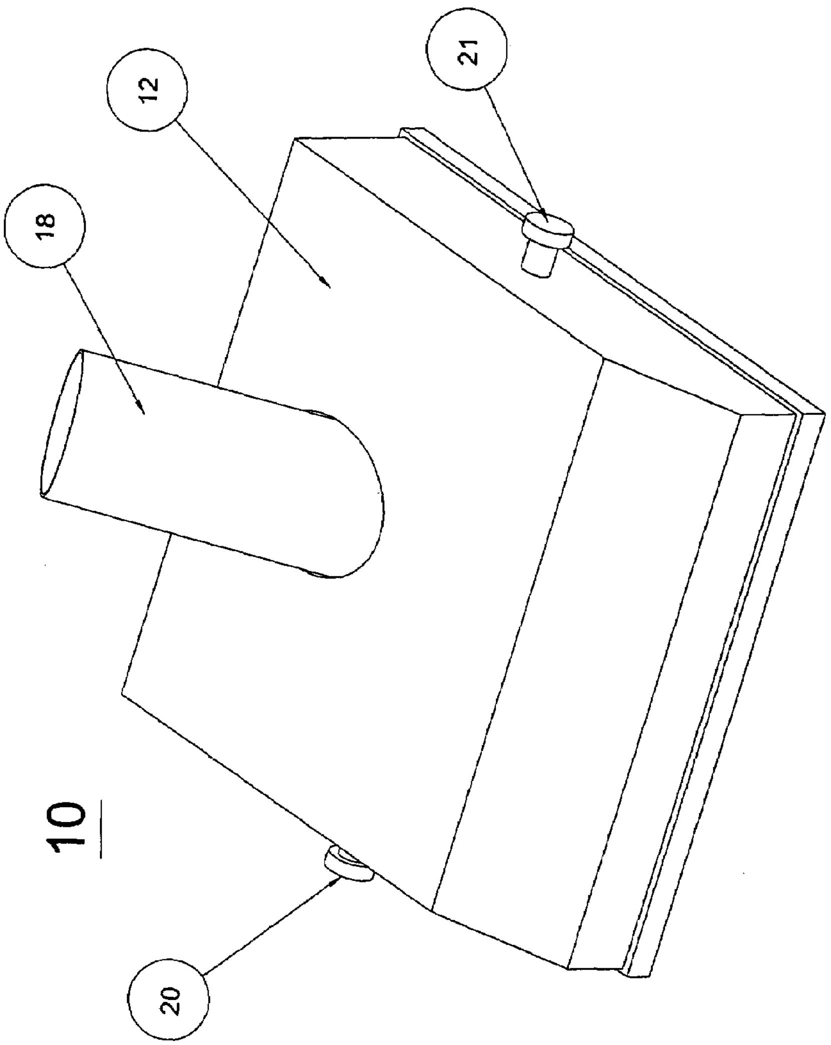
Figure 1 (Prior Art)
FIG. 1 is a perspective view of a prior art feed shoe.
Figure 2:
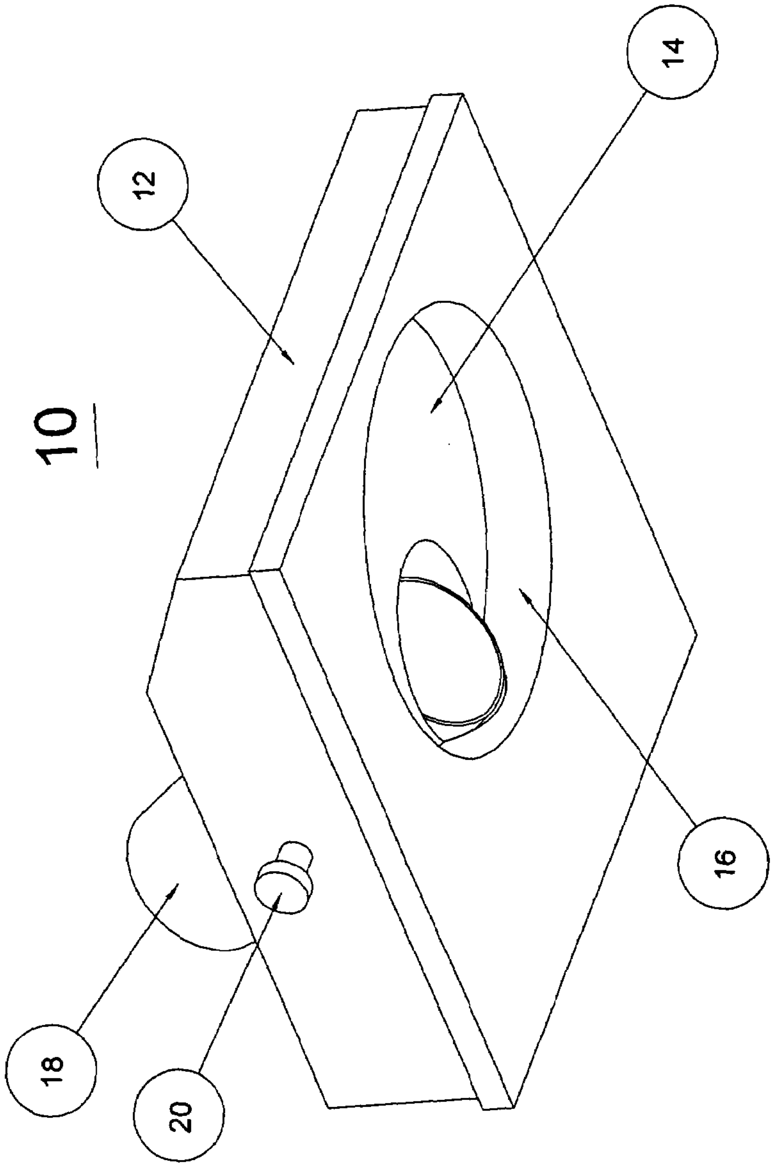
Figure 2 (Prior Art)
FIG. 2 is a perspective view of the underside of the prior art feed shoe shown in FIG. 1.
Figure 3:
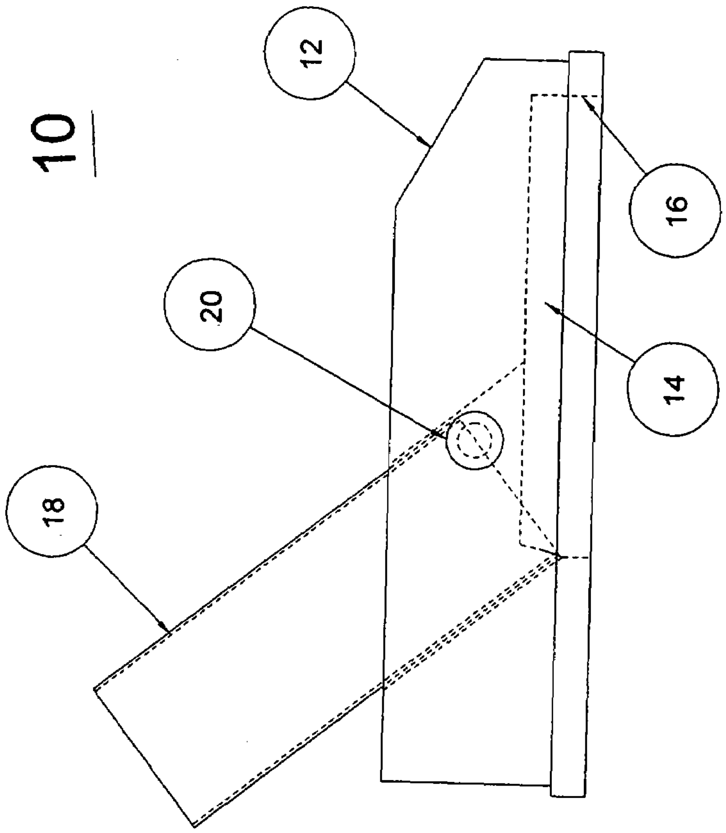
Figure 3 (Prior Art)
FIG. 3 is a side view of the prior art feed shoe shown in FIG. 1.

Referring now to FIGS. 1 through 3, there is shown a prior art type feed shoe 10, including a housing 12 in which is formed a feed chamber 14 and a bottom hole 16 opening into the feed chamber 14 from the underside of the feed shoe 10. An attachment portion 18 for a feed material delivery member, or feed tube (not shown), is provided on the top of the feed shoe 10. The attachment portion has 18 one end connected to the feed tube and an opposite end which extends through the top of the feed shoe 10 into the feed chamber 14. The attachment portion 18 holds the end of the feed tube in communication with the feed chamber 14, in a fixed position to deliver the feed material into the feed chamber 14 to automatically fill, and periodically refill the feed chamber 14, as needed, as the feed chamber 14 is emptied to fill the die cavity during production runs. The opposite end of the feed tube is connected to a remote source of feed material sufficient to supply the feed chamber 14 as needed.

Generally, the bottom of the feed shoe 10 rests slidably? on a platen in which a die cavity is formed, and the feed shoe 10 is attached to a member called a shuttle via pins 20, 21 projecting from each side of the feed shoe 10 (only the feed shoe 10 is shown). The shuttle is operated to move the feed shoe 10 on the platen between a starting position and a second position at which the bottom hole 16 in the feed shoe 10 coincides with the die cavity. When the bottom hole 16 coincides with the die cavity, i.e., overlies in alignment therewith, the material in the feed chamber will be deposited, for example via gravity, into the die cavity. To ensure that the die cavity is completely filled with material, the feed chamber 14 is generally sized to hold more feed material than can be received in the die cavity. Therefore, such that some feed material remains in the feed chamber 14 over and above the opening of the die cavity. After the feed material is deposited into the die cavity, the shuttle is operated to retract the feed shoe 10 back to the starting position. As the feed shoe 10 retracts, the leading edge of the bottom hole 16 will level off the excess material which cannot be received in the die cavity. A press is then operated to compact the feed material in the die cavity, the compacted part is subsequently ejected from the die cavity, and the process can be repeated for as many parts as are to be made during a given production run.

Figure 4:
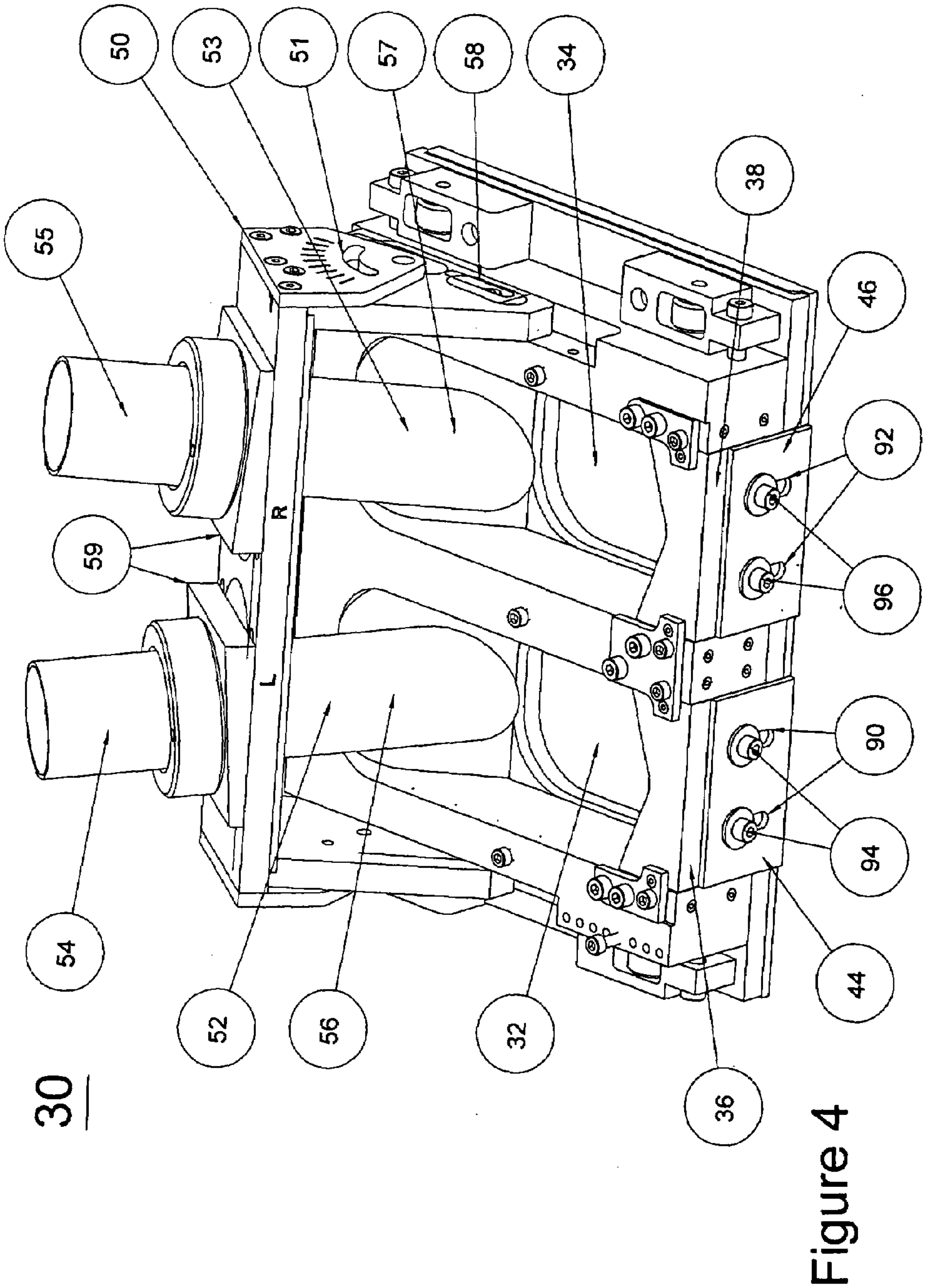
FIG. 4 is a perspective view of an embodiment of a feed shoe according to the invention.
Figure 5:
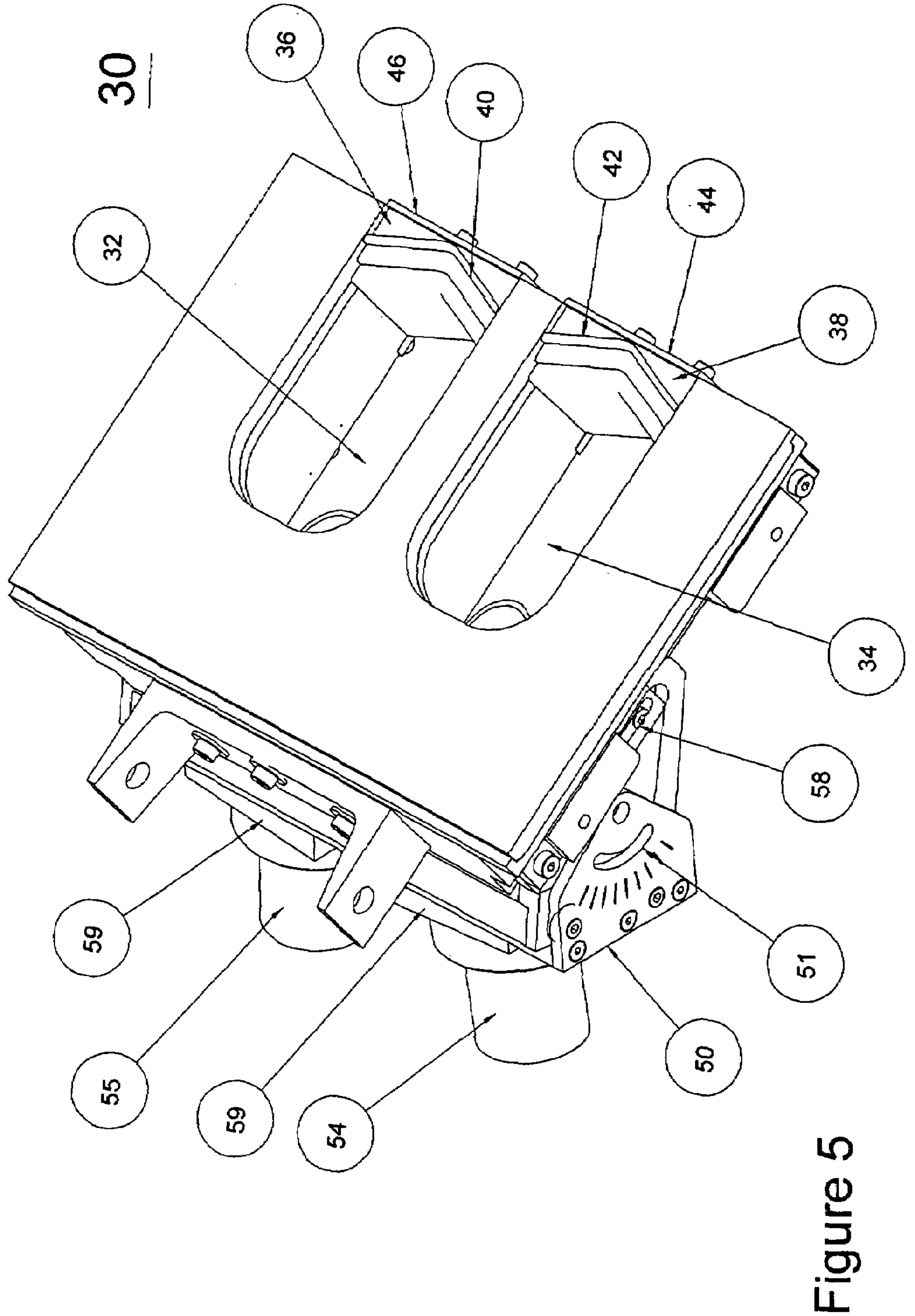
FIG. 5 is a perspective view of the underside of the feed shoe shown in FIG. 4.
Figure 6:
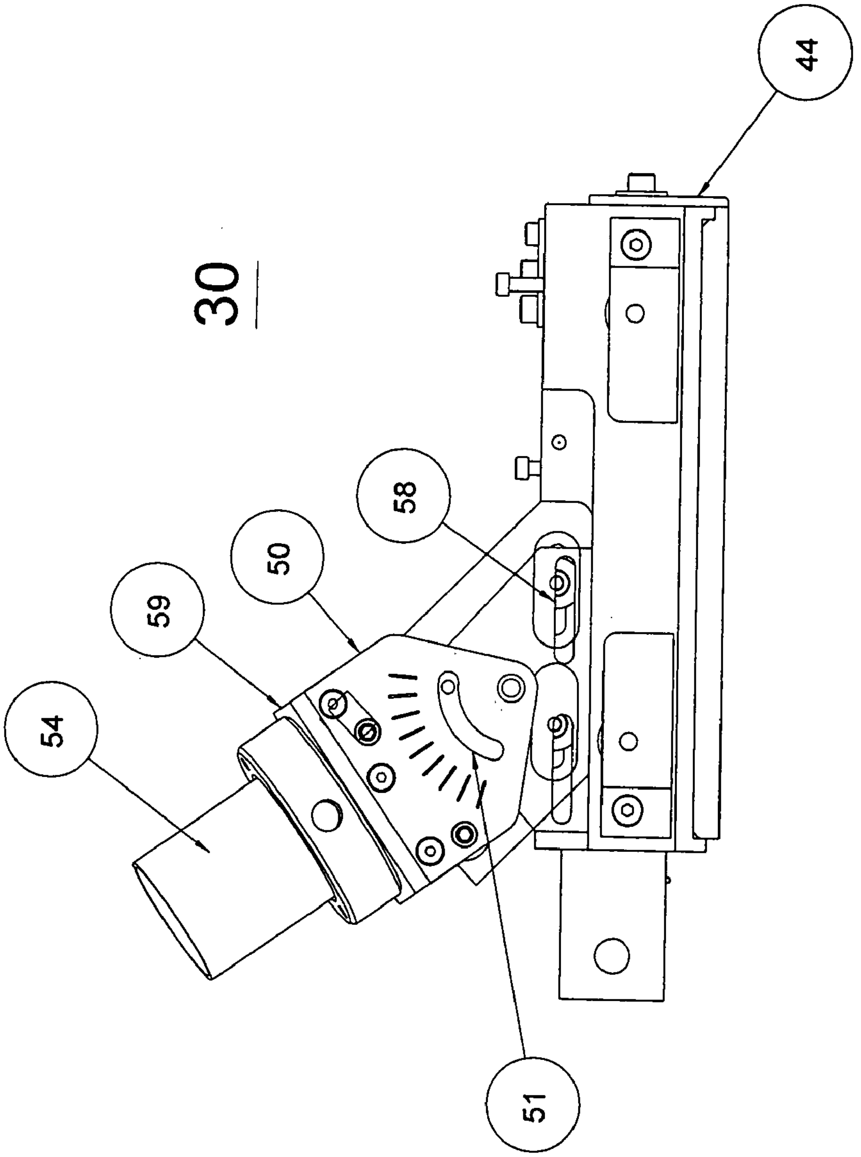
FIG. 6 is a side view of the feed shoe shown in FIG. 4.

FIGS. 4 through 6 shown an embodiment of a feed shoe 30 according to the invention having a pair of feed chambers 32, 34 and a pair of main gates 36, 38, one gate associated with each feed chamber 32, 34. Also shown are a pair of auxiliary gates 44, 46 attached to an outside surface of the main gates 36, 38. The auxiliary gates 44, 46 are optional, and need not be used unless desired. It is also to be understood that a more basic feed shoe in accord with the invention could have a single feed chamber and a single gate, such that the illustrated embodiment could comprise a pair of single feed chamber feed shoes, essentially connected together side-by-side.

The view in FIG. 5 of the underside of the feed shoe 30 best shows the open bottom of the feed chambers 32, 34, and that the lower edge 40, 42 of the main gates 36, 38 is adjacent the open bottom portion. The main gates 36, 38 define the front wall of each feed chamber 32, 34, and the lower edges 40, 42 of the main gates 36, 38 define the leading edge of the feed shoe 30, and also of each feed chamber 32, 34 (when the optional auxiliary gates 44, 46 are not used). Consequently, in the process described previously regarding the operation of a conventional feed shoe to deliver feed material into a die cavity, when the feed shoe 30 of the invention is retracted after depositing feed material into a die cavity, the leading edge of each feed chamber 32, 34, in this case the lower edges 40, 42 of the main gates 36, 38, will be the leading edges which scrape the excess feed material from over, and generally levels the material in the die cavity.

When the optional auxiliary gates 44, 46 are present, the lower edges thereof will define the leading edge of each feed chamber 32, 34.

According to the invention, the main gates 36, 38 can be attached to the front of the feed shoe 30 in a manner that permits the main gates 36, 38 to be vertically adjusted relative to the front portion. In particular, the main gates 36, 38 can be adjusted upwards away from the surface of the platen, and in doing so can permit some feed material to pass under the lower edges 40, 42 of the main gates 36, 38 when the feed shoe 30 is retracted, thus reducing feed material, e.g., powder, "pull-out." Moreover, each side of each main gate 36, 38 can be individually vertically adjustable such that the lower edges 40, 42 of each can be skewed, i.e., one side of each of the main gates 36, 38 can be positioned higher off the platen than the other side. This adjustment feature can be provided to compensate, if needed, for part thickness variation, which can be cause by an uneven platen, die cavity, or underside of the feed shoe 30 or shuttle.

The feed shoe 30 can further comprise a feed tube attachment member 50, which can include a pair of hollow tubular portions 52, 53, each having one end 54, 55 connectable to feed tubes and an opposite end 56, 57 communicating with the feed chambers 32, 34. As shown, the attachment member 50 is connected to the feed shoe 30 in a manner which enables each end 56, 57 of the hollow tubular portions 52, 53 to be adjustable side to side, front to back, and angularly with respect to each feed chamber 32, 34. For example, curved slot and pin arrangements 51 can permit the angular adjustment capability, longitudinal slot and pin arrangements 58 can provide the front to back movement, and angled spacer blocks 59 can enable the side to side positioning as well as angular adjustment in that plane. However, it is to be understood that alternative configurations of providing these types of adjustability could be devised by those of ordinary skill in the art in view the embodiments described herein.

Figure 7:
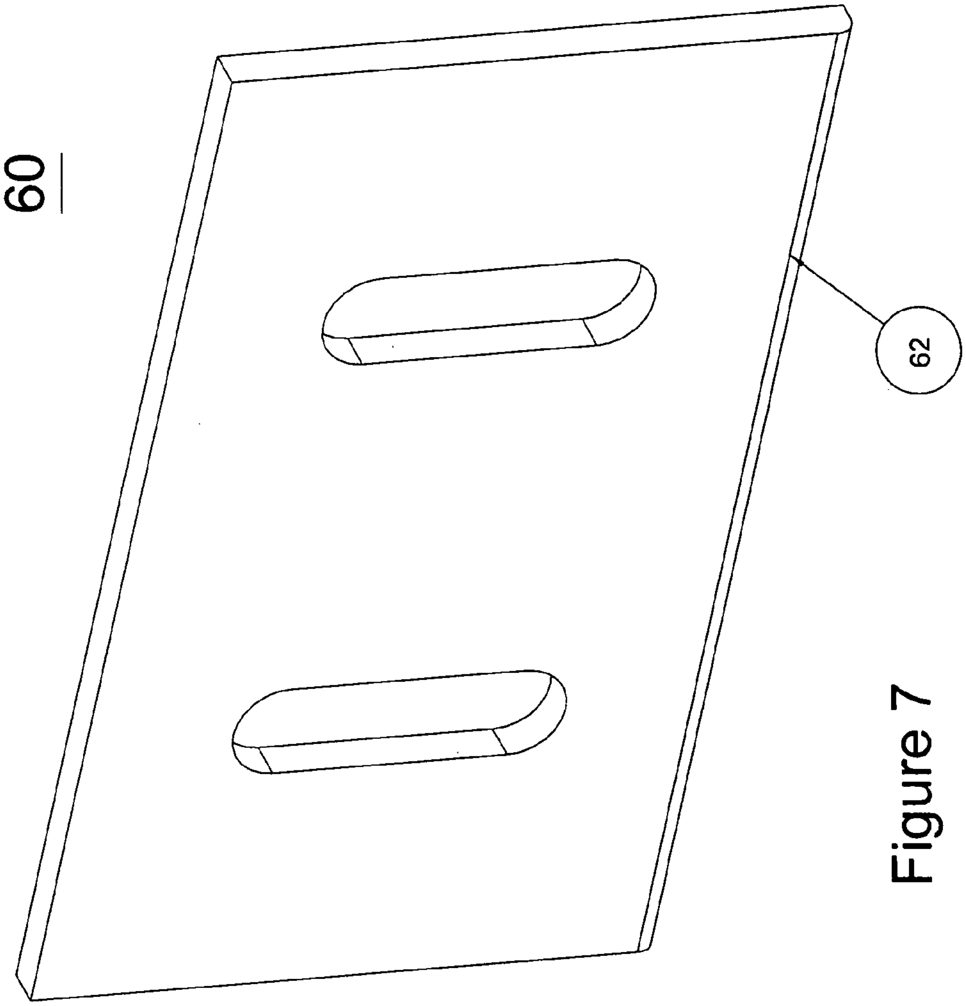
FIG. 7 is a perspective view of an embodiment of an auxiliary gate for a feed shoe according to the invention.
Figure 8:
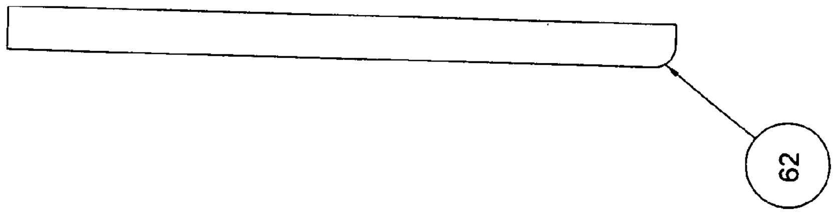
FIG. 8 is a side view of the auxiliary gate shown in FIG. 7.
Figure 9:
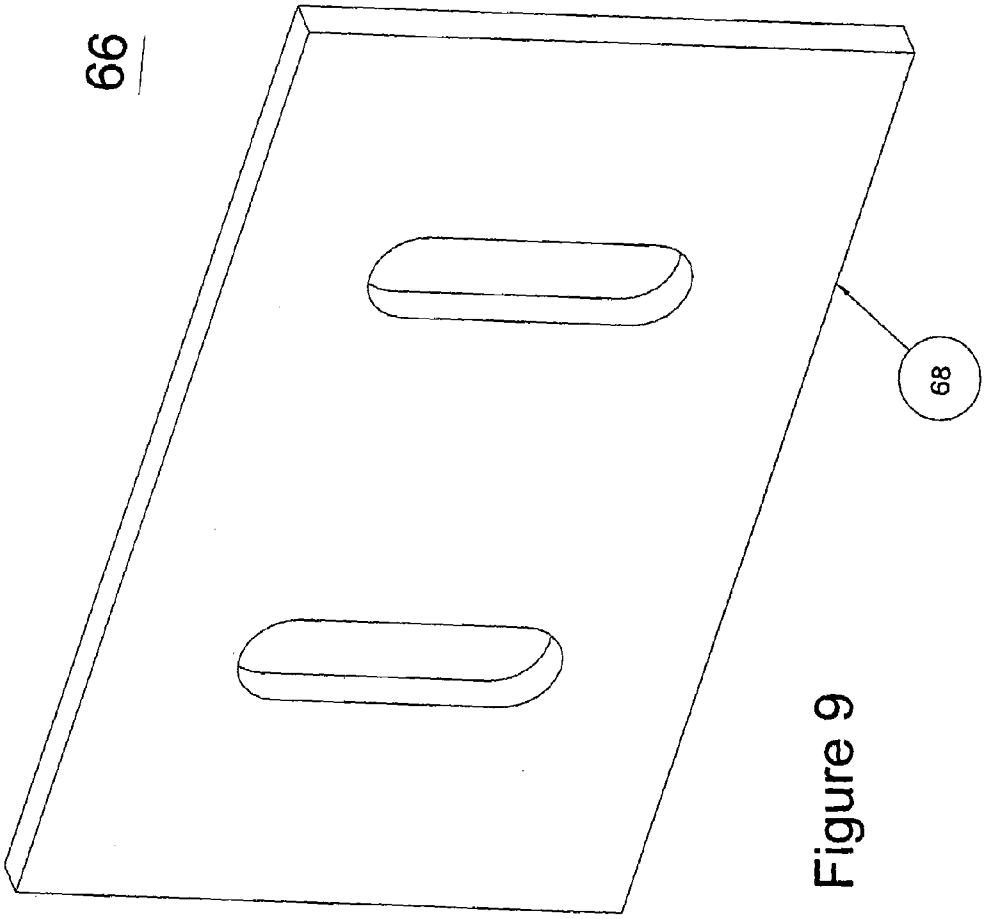
FIG. 9 is a perspective view of another embodiment of an auxiliary gate for a feed shoe according to the invention.
Figure 10:
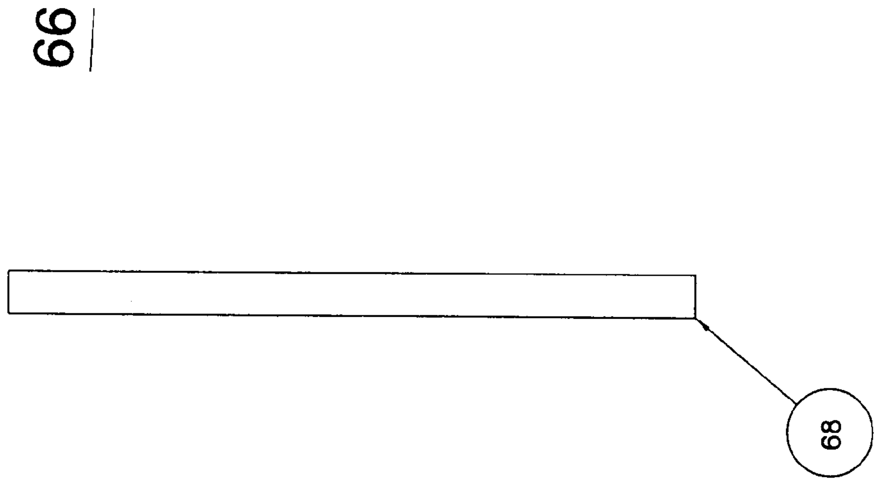
FIG. 10 is a side view of the auxiliary gate shown in FIG. 9.
Figure 11:
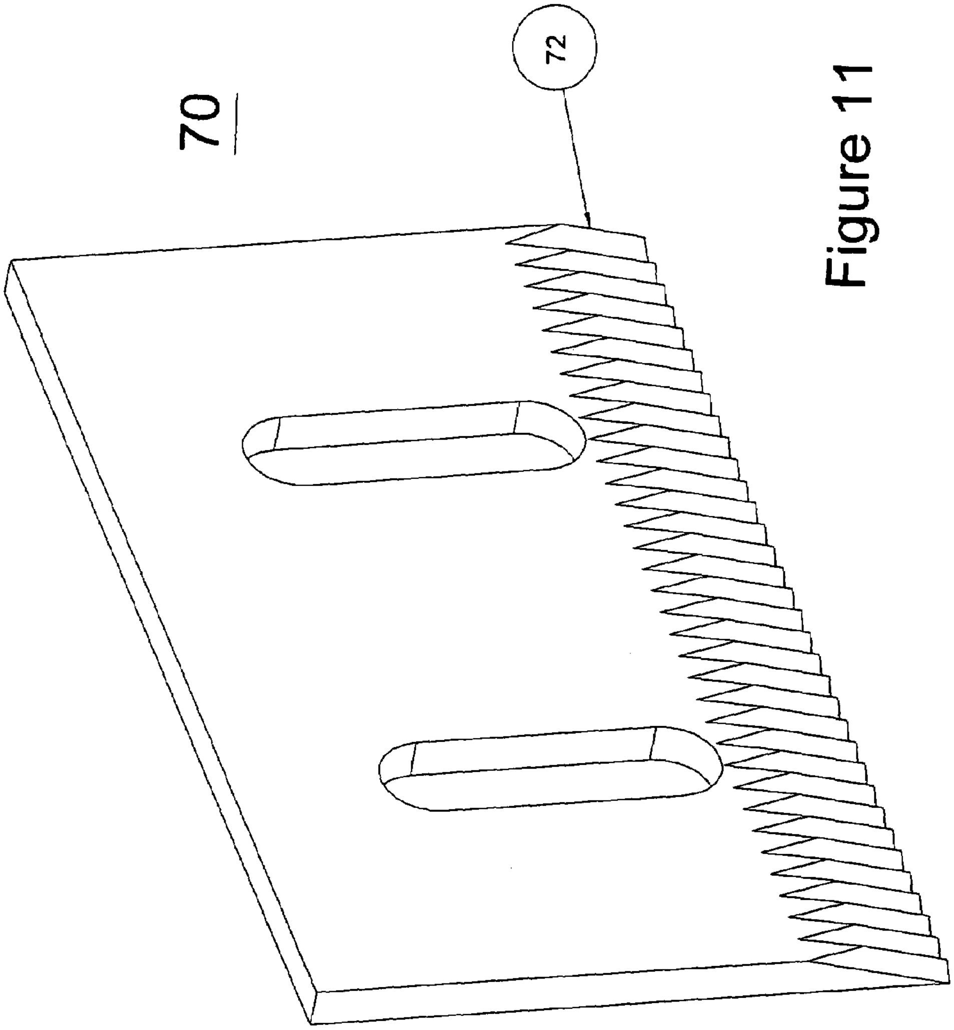
FIG. 11 is a perspective view of a further embodiment of an auxiliary gate for a feed shoe according to the invention.
Figure 12:
FIG. 12 is a side view of the gate shown in FIG. 11.

Referring now to FIGS. 7 through 12, further embodiments of the auxiliary gates 44, 46 are shown. For example, FIGS. 7 and 8 illustrate an embodiment of an auxiliary gate 60 which can be provided with a lower edge 62 having a rounded, half radius, profile. Another embodiment of an auxiliary gate 66 with a lower edge 68 having a flat profile is shown in FIGS. 9 and 10. An embodiment of an auxiliary gate 70 with a lower edge 72 having a serrated profile can also be provided, as shown in FIGS. 11 and 12. In each embodiment, the specially profiled edge is on the side of the auxiliary gates which face toward the feed chambers 32, 34.

According to the invention, the auxiliary gates 44, 46 are optional, and the lower edges 40, 42 of the main gates 36, 38 are the lower, leading edges of the feed shoe 30. Thus, the same types of profiles described above for provision on the lower edges of the auxiliary gates 44, 46 can also be provided on the lower edges 40, 42 of the main gates 36, 38. For example, the rounded profile of the lower edge 62 of auxiliary gate 60 would be provided on the lower edges 40, 42 of the main gates 36, 38, on the edge facing toward the feed chambers 32, 34. As explained above.

Whether provided on the main gates 36, 38 or on the auxiliary gates 44, 46, the edge profiles can be optimized depending upon, e.g., can be a function of, the particular feed material being used. Different profiles can be used to address the aforementioned feed material "pull out" which can occur when the feed shoe 30 is retracted over the die cavity. Initially, the profile may need to be determined experimentally to see which works best with different types of powders. Through testing, certain profiles have been found to function better with different feed materials. For example, the rounded profile, which can be, for example, a ⅛" radius (half radius), can tend to perform best with hard powders, such as cathode and anode. On the other hand, the straight, flat profile can tend to perform best with soft powders, such as electrolyte. The particle size distribution can have an effect on powder pull-out, and therefore die fill consistency. The largest permissible particles in the size distribution of the powder approaches the thickness of the pellet, leading to the possibility that these large particles stick up too high in the die and can be "grabbed" by the leading edge of the main gate (or auxiliary gate when used) during feed shoe retraction. As these particles are pulled back, they may act as a plow and may thus remove excessive amounts of powder. In view of this, the serrated lower edge could be used on the auxiliary gates, being attached in the front of the main gates. The gaps in the serrated edge could permit the larger particles to pass through, reducing the plow effect and associated powder pull-out. In test using a serrated lower edge, no significant improvement in pellet quality was exhibited for cathode and electrolyte powder, but the serrated edge could still potentially be beneficial with other types of powders.

In FIGS. 13 through 18, a still further feature of a feed shoe 30 according to the invention is illustrated, comprising a main gate 80 which can be disposed in each feed chamber 32, 34 adjacent each main gate 36, 38, such that an inner surface 82 of the main gate 80 defines the front wall of each feed chamber 32, 34 and an outer surface 84 of the main gate 80 is adjacent each main gate 36, 38. The inner surface 82 of the main gate 80 can thus be used to effectively change the shape of the feed chambers 32, 34.

The main gate 80 also has a lower most edge adjacent the open bottom of the feed chamber 32, 34, but where auxiliary gates 44, 46 are used, the lower most edge of the main gate 80 can terminate at a downward most extent which is less than the downward most extent of the lower edge of each auxiliary gate 44, 46. Thus, as described previously, the lower edges of the auxiliary gates 44, 46 will define the leading edge of each feed chamber 32, 34 when the auxiliary gates 44, 46 are used along with the main gates.

As shown best in FIGS. 4 and 5, each auxiliary gate 44, 46 can be secured to the outer surface 84 of the main gates 80 in a vertically adjustable manner. For example, vertically elongated slots 90, 92 can be provided in each optional auxiliary gate 44, 46 and each optional auxiliary gate 44, 46 can be secured to the outer surface 84 of the main gates 80 by fasteners 94, 96, which can be screws held in threaded openings provided in the outer surface 84 of the main gate 80. Thus, with the fasteners 94, 96 loosened, the optional auxiliary gates 36, 38 can be moved vertically, or even skewed, and the fasteners 94, 96 thereafter tightened to hold the optional auxiliary gates 44, 46 in the set position. Alternatively, it will be recognized that other manners of attachment could be devised by those of ordinary skill in the art, and that the auxiliary gates 44, 46 could be secured to the front of the feed shoe 30 instead of the outside surfaces of the main gates.

As would be known to those of ordinary skill in the art, the vertically adjustable feature of the main gates 36, 38 can be provided in various ways, for example, using fine thread jackscrews to provide precise vertical height adjustment, and employing springs to hold pressure against jackscrews to secure the gate in position after adjustment. Also, to even more securely maintain the main gates 36, 38 in a desired position, locking setscrews could be employed.

Figure 13:
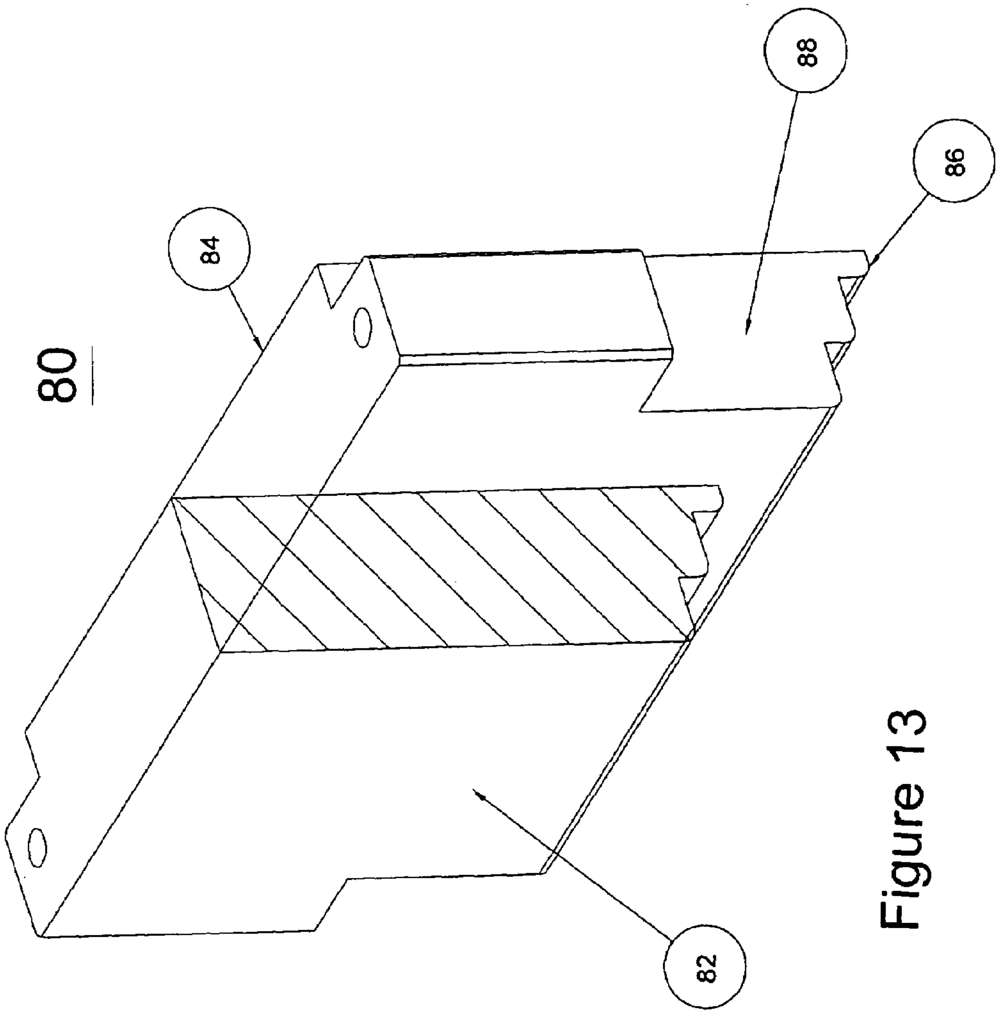
FIG. 13 is a perspective view of an embodiment of a main gate for a feed shoe according to the invention.
Figure 14:
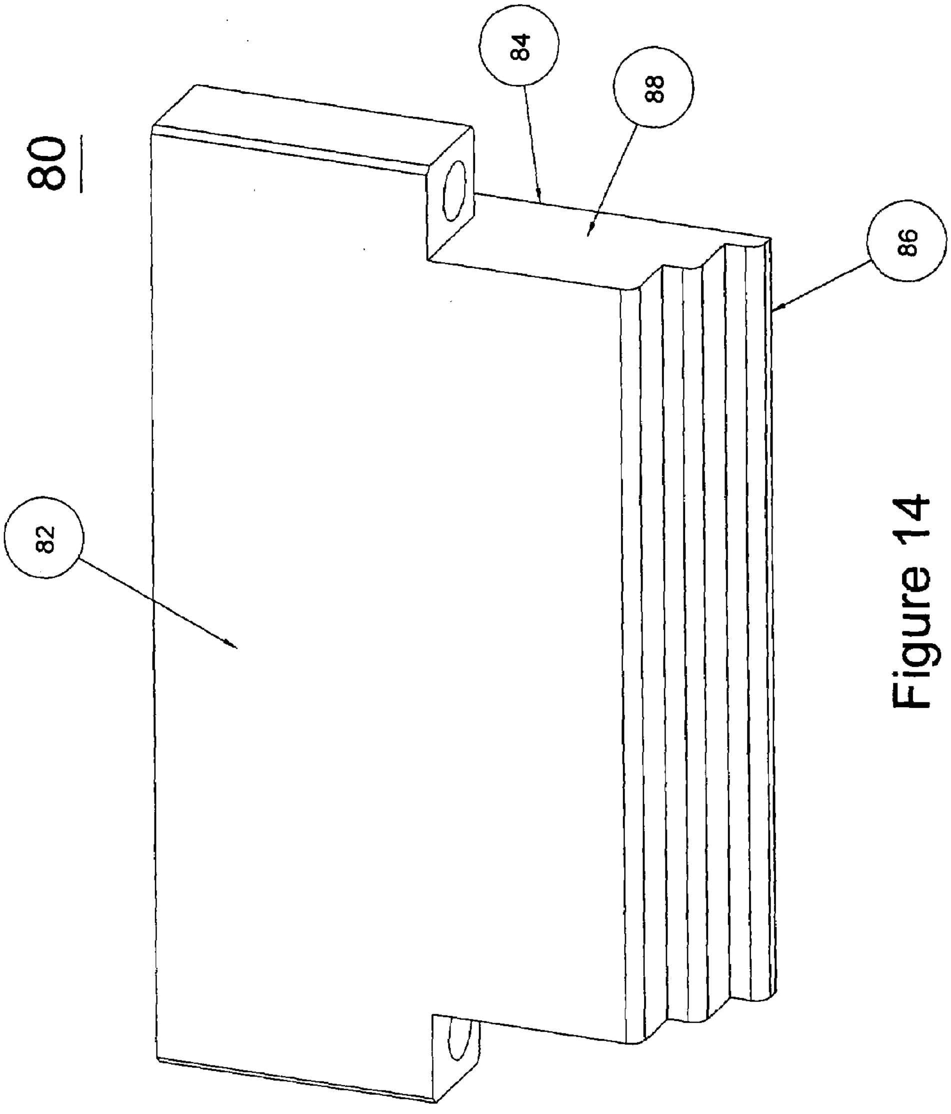
FIG. 14 is a perspective view taken from a different angle the main gate shown in FIG. 13.
Figure 15:
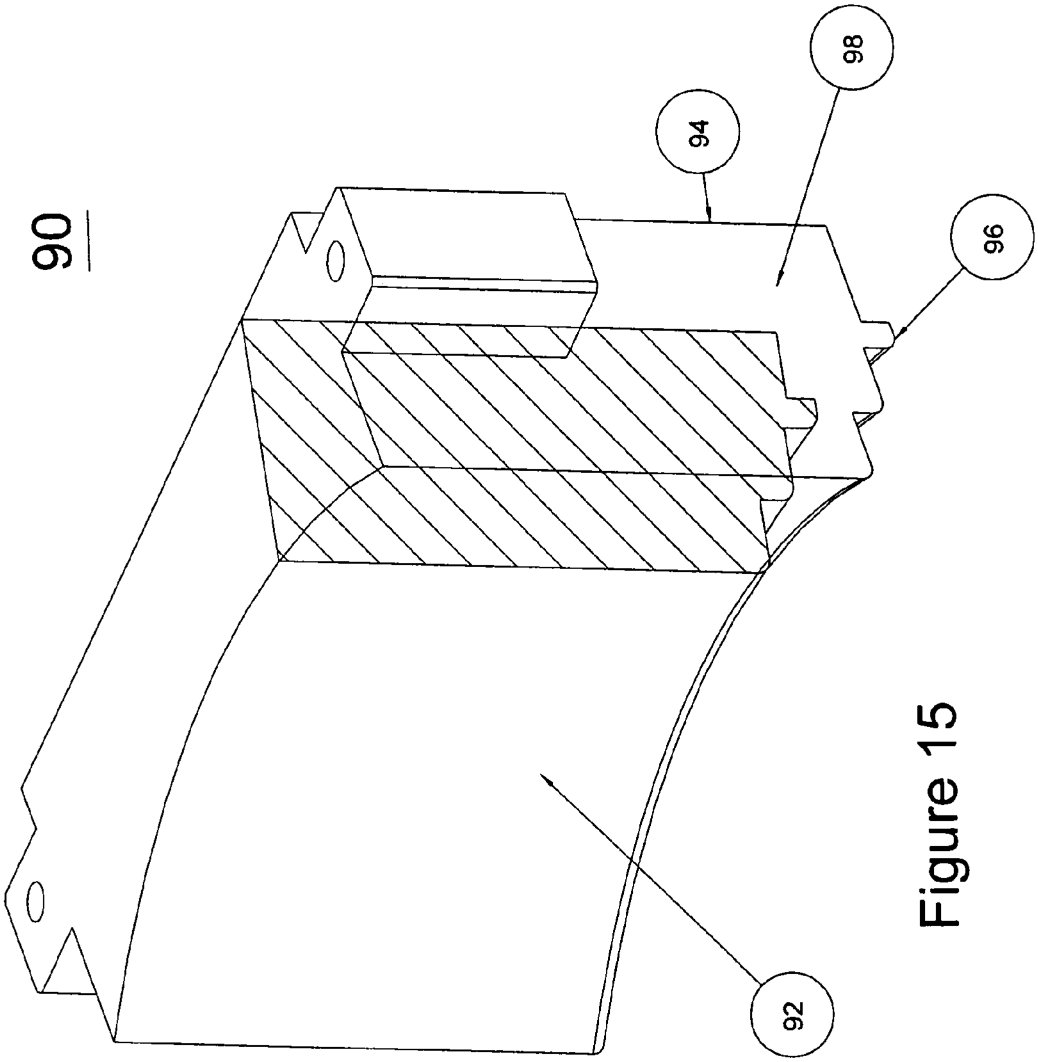
FIG. 15 is a perspective view of another embodiment of a main gate for a feed shoe according to the invention.
Figure 16:
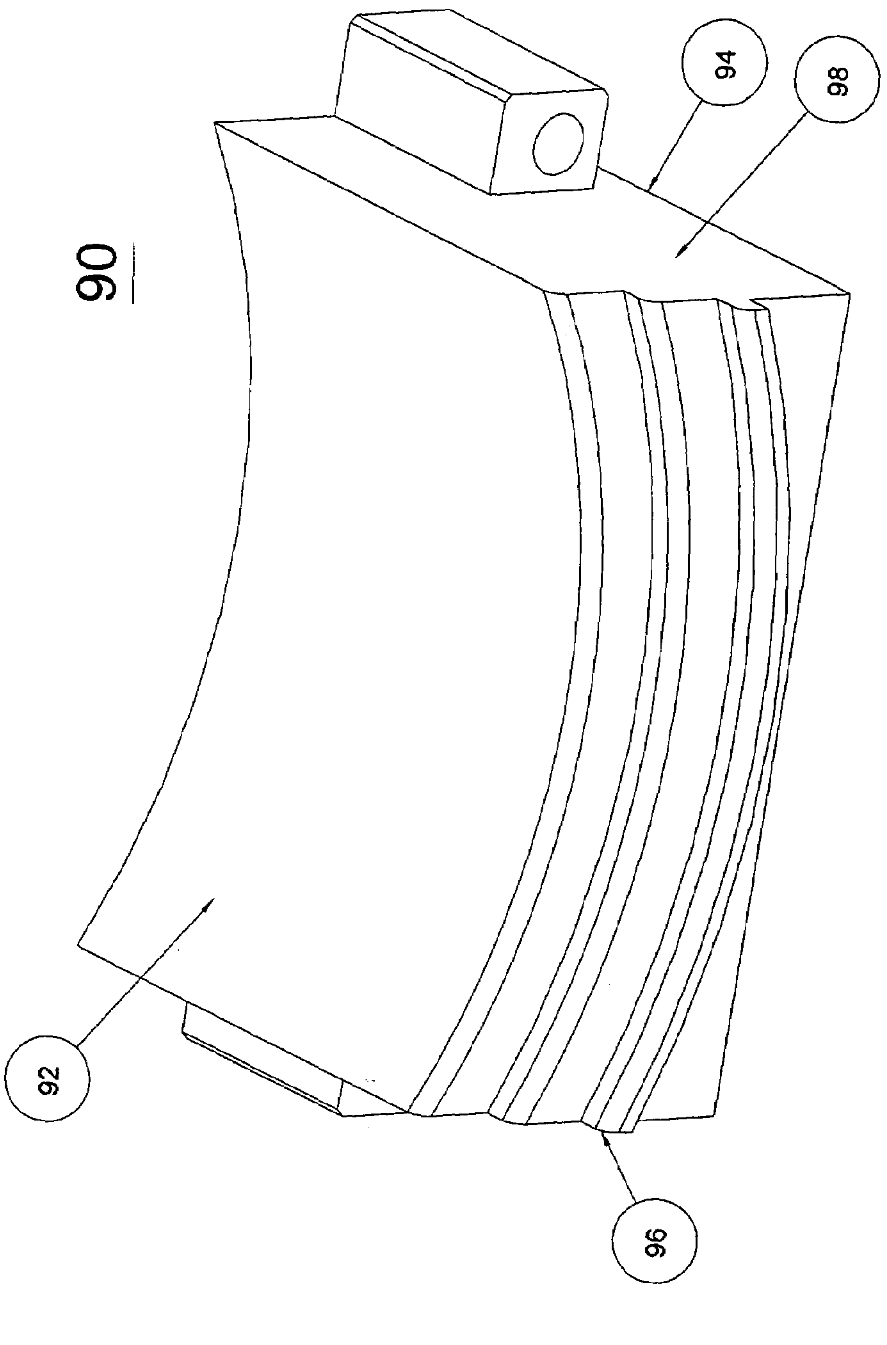
FIG. 16 is a perspective view taken from a different angle the main gate shown in FIG. 15.
Figure 17:
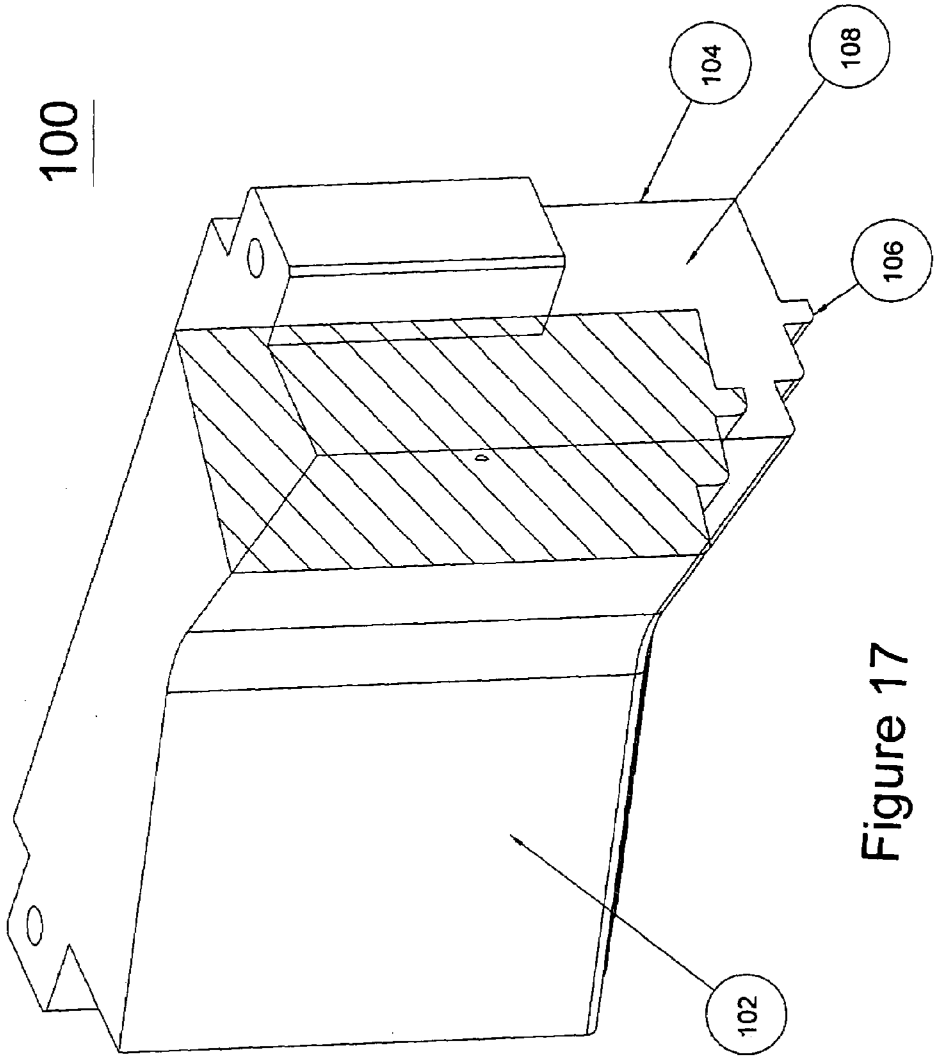
FIG. 17 is a perspective view of a further embodiment of a main gate for a feed shoe according to the invention.
Figure 18:
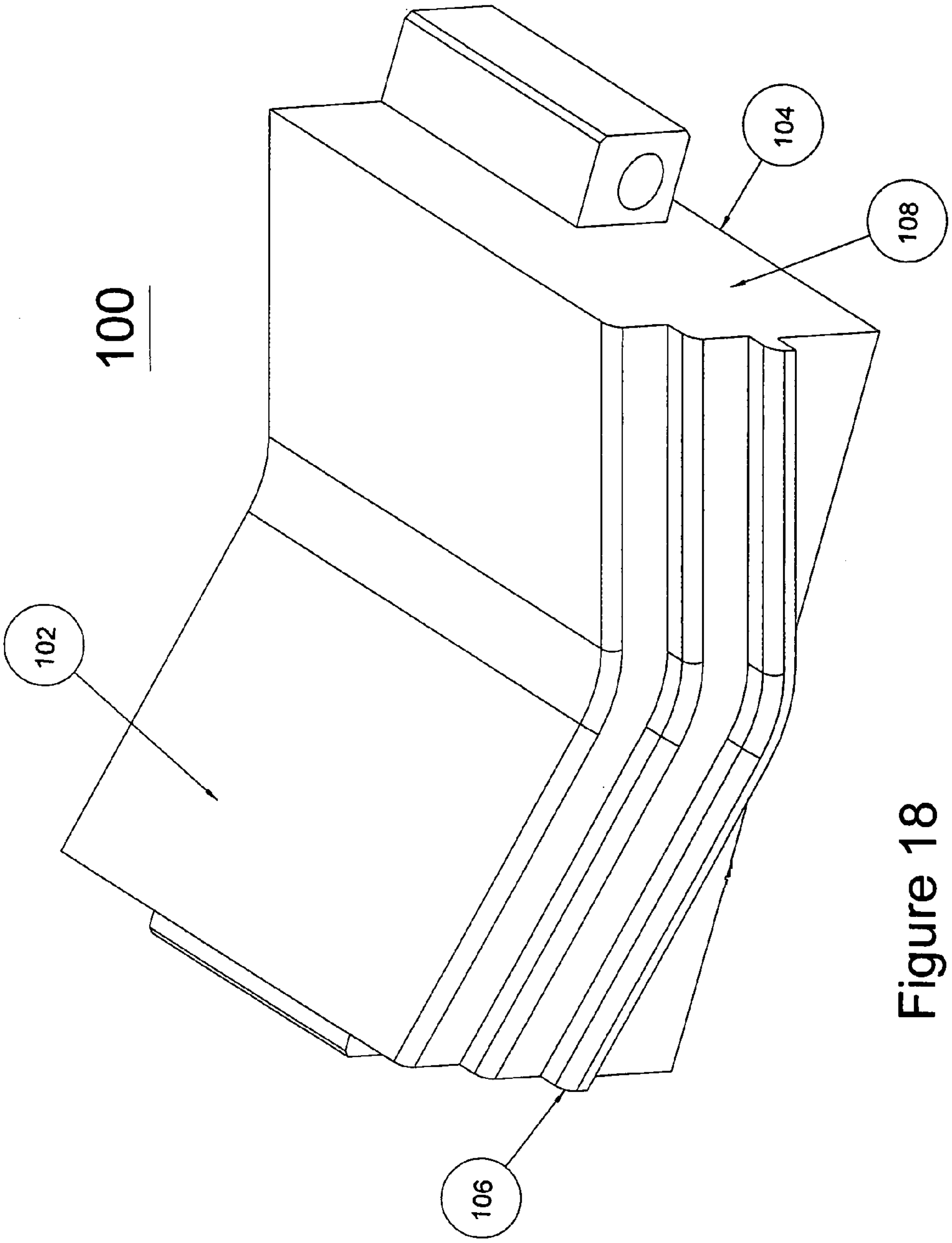
FIG. 18 is a perspective view taken from a different angle the main gate shown in FIG. 17.

As mentioned above, the inner surface of the main gates can be used to change the shape of the feed chambers 32, 34, which can be accomplished according to the invention by forming the main gates 36, 38 with differently configured inner surfaces, as shown in FIGS. 13 through 18. Referring particularly to FIGS. 13 and 14, an embodiment of a main gate 80 is shown wherein the inner surface 82 is simply flat. An additional embodiment of a main gate 90 is shown in FIGS. 15 and 16 having a curved inner surface 92, and another embodiment of a main gate 100 having a V-shaped inner surface 102 is illustrated in FIGS. 17 and 18. Each of the main gates 90 and 100 having the curved and V-shaped inner surfaces 92, 102 can be concave facing toward the feed chambers 32, 34. Each of the embodiments of the main gates 80, 90, and 100 can have a generally flat outer surface thereof 84, 94, and 104, to which the aforesaid auxiliary gates can be attached.

The main gate 100 having the V-shaped inner surface 102 exhibited the best performance for the cathode power compared to the main gates 80 and 90 having the flat 82 and curved 92 inner surfaces, but only by a small margin. However, the main gate 100 with the V-shaped inner surface 102 exhibited a more significant improvement when electrolytic powder was used as the feed material.

In addition to the shape of the inner surfaces 82, 92, 102, as well as the specially profiled lower edges, described hereinabove, each of the differently shaped inner surfaces 82, 92, 102 of the main gates 80, 90, 100 can be provided with a specially designed profile on at least a lower portion 88, 98, 108 of the inner surfaces 82, 92, 102 thereof, i.e., the portion 88, 98, 108 of the inner surfaces 82, 92, 102 near the open bottom of the feed chambers 32, 34. For example, the lower portion 88, 98, 108 can have a profile, or cross section, which has an increasingly thicker cross section upwards from the open bottom of the feed chambers 32, 34. As shown in each of FIGS. 13 through 18, this profile can preferably be a stepped configuration. The stepped profile can result in the feed material in the feed chambers 32, 34 being sheared in separate planes, formed by each step, whenever the feed shoe is retracted after depositing feed material into the die cavity. Shearing separate planes of the feed material, i.e., powder, over the die cavity reduces the weight of the powder and the affect it has on the powder in the die cavity as the leading edges of the feed chambers 32, 34 (or the lower edges of the auxiliary gates when used) level the powder in the die cavity. The stepped configurations can be made with adjustable segments, providing the flexibility to allow steps of various heights and depths. Although the stepped configuration can be preferred, it is to be understood that other configurations could also potentially be used, such as, for example, a tapered, or smoothly sloping, profile.

As shown in FIGS. 4 through 6, the feed chambers 32, 44 can be housed in a low profile, forwardly extending front portion of the feed shoe 30, and the attachment portion 50 with associated hollow tube portions 52, 53 can be connected to a rear portion of the feed shoe 30. In this manner of design, with the feed tubes connected at the rear of the feed shoe 30 and the forwardly extending front portion of the feed shoe 30 having a low profile, the press member will only need be raised to a minimal vertical height sufficient to clear the front low profile portion of the feed shoe 30. This can significantly reduce cycle time between pressing parts in said die cavity, and thereby speed up production.

A feed shoe 30 according to the invention, as described above, can also overcome problems associated with conventional feed shoes particularly related to non-uniform die fill. Non-uniform die cavity filling can result in non-uniform part density, which may affect the part quality, properties and production yield. Non-uniform die cavity fill can be the result of, for example, powder pull-out, uneven leveling of the die cavity, and the lack of independent weight control between the multiple die cavities housed in a common die platen. Non-uniform die cavity fill can also be caused by inconsistencies between individual die cavities, which can be attributed to variations in tooling heights/flatness, as well as powder flow. Therefore, the production advantage of multiple die cavity pressing may not be fully exploited without independent weight control over the feed material deposited in each feed chamber.

As described previously, these disadvantages are overcome by the feed shoe according to the invention using a gate member which is height adjustable, such as to allow powder to flow from this opening, which can reduce powder pull out as the feed shoe retracts over the die cavity. The gate member can further also be skewed to compensate for part thickness variation, enabling improved side-to-side fill consistency. In addition, the inner surface of the gate, or the inner surface of a separate insert, can be configured to change the shape of the feed chamber, and in particular can have a stepped configuration to alter the powder shearing planes. Shearing separate planes of powder over the die reduces the weight of the powder and the affect it has on the powder in the die cavity as the feed shoe levels the powder.

When pressing multiple die cavities, a feed shoe according to the invention can have multiple feed chambers and a gate associated with each feed chamber. The separate gates can facilitate individual die cavity fill changes to meet part weight requirements while pressing multiple parts within the same cycle. The adjustable gate provides a controlled leakage, i.e., permits powder to roll under the leading edge of the gate during feed shoe retraction, which not only reduces the effects of powder pull-out, but also facilitates independent weight control of feed material deposited in each die cavity. This makes it possible to satisfactorily press two pellets at one time, thus doubling the production rate. By adjusting the gate so there's controlled leakage or a powder film left over the die as the shoe retracts, the die fill volume and part weight are effectively increased. For example, if the left side is producing parts that are at nominal weight and the right side is producing parts that are light or out of specification, the right side gate can be adjusted to increase the powder weight in that die only. Now both dies are producing parts that are in tolerance. If the press had independent die control with respect to the lower punches then the individual weight adjustments could be accomplished. However this press feature would require separate feed shoes since they would need to move independent of one another or so they could move with the separate dies. Typical presses have one die platen that houses each die. Therefore, adjusting the die fill for one die will change the others unless the lower punch is adjustable. However, the lower punch adjustment feature has load and space limitations. [Explain how adjustable gate—allowing controlled leakage—enables independent weight control of each die cavity.]

The provision of multiple, isolated feed chambers, and a separate hollow feed tube attachment portions for each feed chamber better facilitates powder flow. In addition, the angular, side to side and front to back adjustability of the attachment member can also contribute to reducing problems associated with powder distribution within the feed chambers of conventional feed shoes. The feed shoe can be made from, for example, 304 stainless steel to provide increased durability over time while maintaining a corrosion resistance. The gate can be constructed from, for example, a durable tool steel, and can also be coated with TiCN for increased wear resistance.

Although certain embodiments of the invention have been described in detail hereinabove, it will be appreciated by those skilled in the art that various modifications to those details could be developed in light of the overall teaching of the disclosure. Accordingly, the particular embodiments disclosed herein are intended to be illustrative only and not limiting to the scope of the invention, which should be awarded the full breadth of the following claims and any and all embodiments thereof.

What is claimed is:

1. A feed shoe comprising:

a. at least one feed chamber having an open bottom portion and an open front portion;

b. a gate at said open front portion defining a front wall of said at least one feed chamber, said gate having a lower edge adjacent said open bottom portion, said lower edge defining a leading edge of said at least one feed chamber; and c. a vertically adjustable gate, said vertically adjustable gate having opposite sides connected at said front portion and said opposite sides being individually vertically adjustable such that said lower edge can be skewed wherein one of said opposite sides is positioned at a different vertical position relative to the other of said opposite sides.

2. The feed shoe of claim 1 wherein said lower edge has a profile which is a function of a type of material to be deposited into said at least one feed chamber.

3. The feed shoe of claim 2 wherein said profile further comprises one of serrated, rounded, and flat.

4. A feed shoe comprising:

a. at least one feed chamber having an open bottom portion and an open front portion; and b. a gate at said open front portion defining a front wall of said at least one feed chamber, said gate having a lower edge adjacent said open bottom portion, said gate having an inner surface defining a front wall of said feed chamber, and said inner surface being either curved or V-shaped.

5. A feed shoe comprising:

a. at least one feed chamber having an open bottom portion and an open front portion; and b. a gate at said open front portion defining a front wall of said at least one feed chamber, said gate having a lower edge adjacent said open bottom portion, said lower portion having a profile which increases in thickness upwardly from said open bottom portion.

6. The feed shoe of claim 5 wherein said profile is stepped such that said increases in thickness are provided in steps, such that material in said at least one feed chamber is sheared in separate planes when said feed shoe is moved from a second position to a first position.

7. A feed shoe comprising:

a. at least one feed chamber having an open bottom portion and an open front portion;

b. a gate at said open font portion defining a front wall of said at least one feed chamber; and c. an auxiliary gate disposed adjacent said gate on a side thereof opposite said feed chamber, said auxiliary gate having a lower edge which defines said leading edge of said at least one feed chamber.

8. A feed shoe comprising:

a. at least one feed chamber having an open bottom portion and an open front portion;

b. a gate at said open front portion defining a front wall of said at least one feed chamber, said gate having a lower edge adjacent said open bottom portion, said lower edge defining a leading edge of said at least one feed chamber; and c. an attachment portion adapted for holding an end of a material delivery member in communication with said at least one feed chamber, wherein said attachment portion is adjustably attached to said feed shoe such that said end of said material delivery member is movable relative to said at least one feed chamber to adjust delivery of said material thereinto.

9. The feed shoe of claim 8 wherein said attachment member is adjustable at least one of front to back, side to side, and angularly.

10. The feed shoe of claim 9 further comprising:

a. said feed chamber housed in a low profile forwardly extending front portion of said feed shoe;

b. said attachment portion connected to a rear portion of said feed shoe such that said one end of said material delivery member is held in communication with a rear portion of said feed chamber; and c. wherein said feed material delivery member is held at a rear portion of said feed shoe and said forwardly extending front portion of said feed shoe has a low profile such that a press member need be raised to a minimal vertical height sufficient to clear said low profile front portion which reduces cycle time between pressing parts in said die cavity.

11. A feed shoe comprising:

a. at least one feed chamber having an open bottom portion and an open front portion; and b. a gate at said open front portion defining a front wall of said at least one feed chamber, said gate having a lower edge adjacent said open bottom portion, said lower edge defining a leading edge of said at least one feed chamber; and c. wherein said at least one feed chamber further comprises at least two feed chambers, each having said open bottom portion and said gate.

12. The feed shoe of claim 11 further comprising an attachment portion adapted for holding one end of each of at least two material delivery members, each end of said at least two material delivery members held in communication with a respective one of said at least two feed chambers.

13. The feed shoe of claim 12 wherein said attachment portion is adjustably attached to said feed shoe such that said one end of each of said at least two material delivery members is movable relative to each respective said at least two feed chambers to adjust delivery of said material thereinto.

14. The feed shoe of claim 13 wherein said attachment member is adjustable at least one of front to back, side to side, and angularly.

15. In a feed shoe having a feed chamber and a bottom hole through said feed chamber, wherein a leading edge of said bottom hole defines a leading edge of said feed chamber, the improvement comprising:

a. said feed chamber having an open front portion;

b. said bottom hole being an open bottom portion; and c. a vertically adjustable gate at said open front portion, said gate defining a front wall of said at least one feed chamber, said gate having a lower edge adjacent said open bottom portion, and said lower edge defining said leading edge of said feed chamber;

d. wherein said vertically adjustable gate has opposite sides connected at said front portion, said opposite sides being individually vertically adjustable such that said lower edge can be skewed wherein one of said opposite sides is positioned at a different vertical position relative to the other of said opposite sides.

16. The improvement of claim 15 wherein said lower edge has a profile which is a function of a type of material to be deposited into said at least one feed chamber.

17. The improvement of claim 16 wherein said profile further comprises one of serrated, rounded, and flat.

18. In a feed shoe having a feed chamber and a bottom hole through said feed chamber, wherein a leading edge of said bottom hole defines a leading edge of said feed chamber, the improvement comprising:

a. said feed chamber having an open front portion;

b. said bottom hole being an open bottom portion; and c. a gate at said open front portion, said gate defining a front wall of said at least one feed chamber, said gate having an inner surface defining a front wall of said feed chamber, and said inner surface being either curved or V-shaped.

19. In a feed shoe having a feed chamber and a bottom hole through said feed chamber, wherein a leading edge of said bottom hole defines a leading edge of said feed chamber, the improvement comprising:

a. said feed chamber having an open front portion;

b. said bottom hole being an open bottom portion; and c. a gate at said open front portion, said gate defining a front wall of said at least one feed chamber, said gate having a lower edge adjacent said open bottom portion, said lower portion having a profile which increases in thickness upwardly from said open bottom portion.

20. The improvement of claim 19 wherein said profile is stepped such that said increases in thickness are provided in steps, such that material in said at least one feed chamber is sheared in separate planes when said feed shoe is moved from a second position to a first position.

21. In a feed shoe having a feed chamber and a bottom hole through said feed chamber, wherein a leading edge of said bottom hole defines a leading edge of said feed chamber, the improvement comprising:

a. said feed chamber having an open front portion;

b. said bottom hole being an open bottom portion; and c. a gate at said open front portion, said gate defining a front wall of said at least one feed chamber, and d. an auxiliary gate disposed adjacent said gate on a side thereof opposite said feed chamber, said auxiliary gate having a lower edge which defines said leading edge of said at least one feed chamber.

22. In a feed shoe having a feed chamber and a bottom hole through said feed chamber, wherein a leading edge of said bottom hole defines a leading edge of said feed chamber, the improvement comprising:

a. said feed chamber having an open front portion;

b. said bottom hole being an open bottom portion;

c. a gate at said open front portion, said gate defining a front wall of said at least one feed chamber, said gate having a lower edge adjacent said open bottom portion, and said lower edge defining said leading edge of said feed chamber; and an attachment portion adapted for holding an end of a material delivery member in communication with said at least one feed chamber, wherein said attachment portion is adjustably attached to said feed shoe such that said end of said material delivery member is movable relative to said at least one feed chamber to adjust delivery of said material thereinto.

23. The improvement of claim 22 wherein said attachment member is adjustable at least one of front to back, side to side, and angularly.

24. The improvement of claim 22 further comprising:

a. said feed chamber housed in a low profile forwardly extending front portion of said feed shoe;

b. said attachment portion connected to a rear portion of said feed shoe such that said one end of said material delivery member is held in communication with a rear portion of said feed chamber; and c. wherein said feed material delivery member is held at a rear portion of said feed shoe and said forwardly extending front portion of said feed shoe has a low profile such that a press member need be raised to a minimal vertical height sufficient to clear said low profile front portion which reduces cycle time between pressing parts in said die cavity.

25. The improvement of claim 15 wherein said at least one feed chamber further comprises at least two feed chambers, each having said open bottom portion and said gate.

26. The improvement of claim 25 further comprising an attachment portion adapted for holding one end of each of at least two material delivery members, each end of said at least two material delivery members held in communication with a respective one of said at least two feed chambers.

27. The improvement of claim 26 wherein said attachment portion is adjustably attached to said feed shoe such that said one end of each of said at least two material delivery members is movable relative to each respective said at least two feed chambers to adjust delivery of said material thereinto.

28. The improvement of claim 27 wherein said attachment member is adjustable at least one of front to back, side to side, and angularly.

* * * * *

UNITED STATES PATENT AND TRADEMARK OFFICE

CERTIFICATE OF CORRECTION

PATENT NO. : 7,267,543 B2
APPLICATION NO. : 10/832559
DATED : September 11, 2007
INVENTOR(S) : Timothy G. Freidhoff and Alan William Baum It is certified that error appears in the above-identified patent and that said Letters Patent is hereby corrected as shown below:

Column 9, claim 7, line 59, change “font” to --front--.

Column 12, claim 22, line 7, after “and” insert a new paragraph. Before “an attachment portion”, insert --d.--.

Signed and Sealed this

Thirteenth Day of May, 2008

JON W. DUDAS
*Director of the United States Patent and Trademark Office*